July 10, 1945.  G. B. JONES  2,380,049
BARK PEELING MACHINE
Filed Oct. 6, 1942  4 Sheets-Sheet 1

INVENTOR
Geo. B. Jones
BY
ATTORNEYS

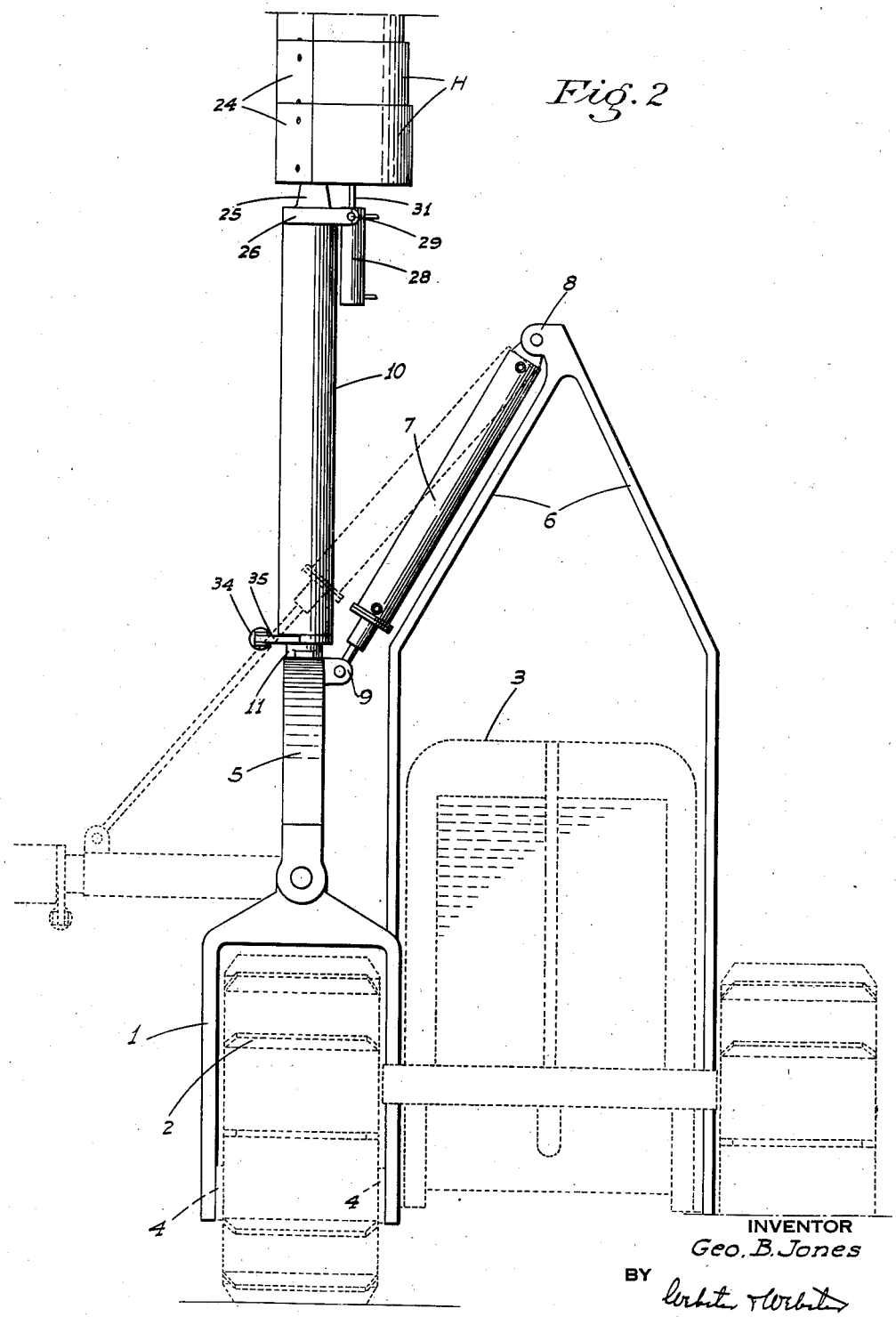

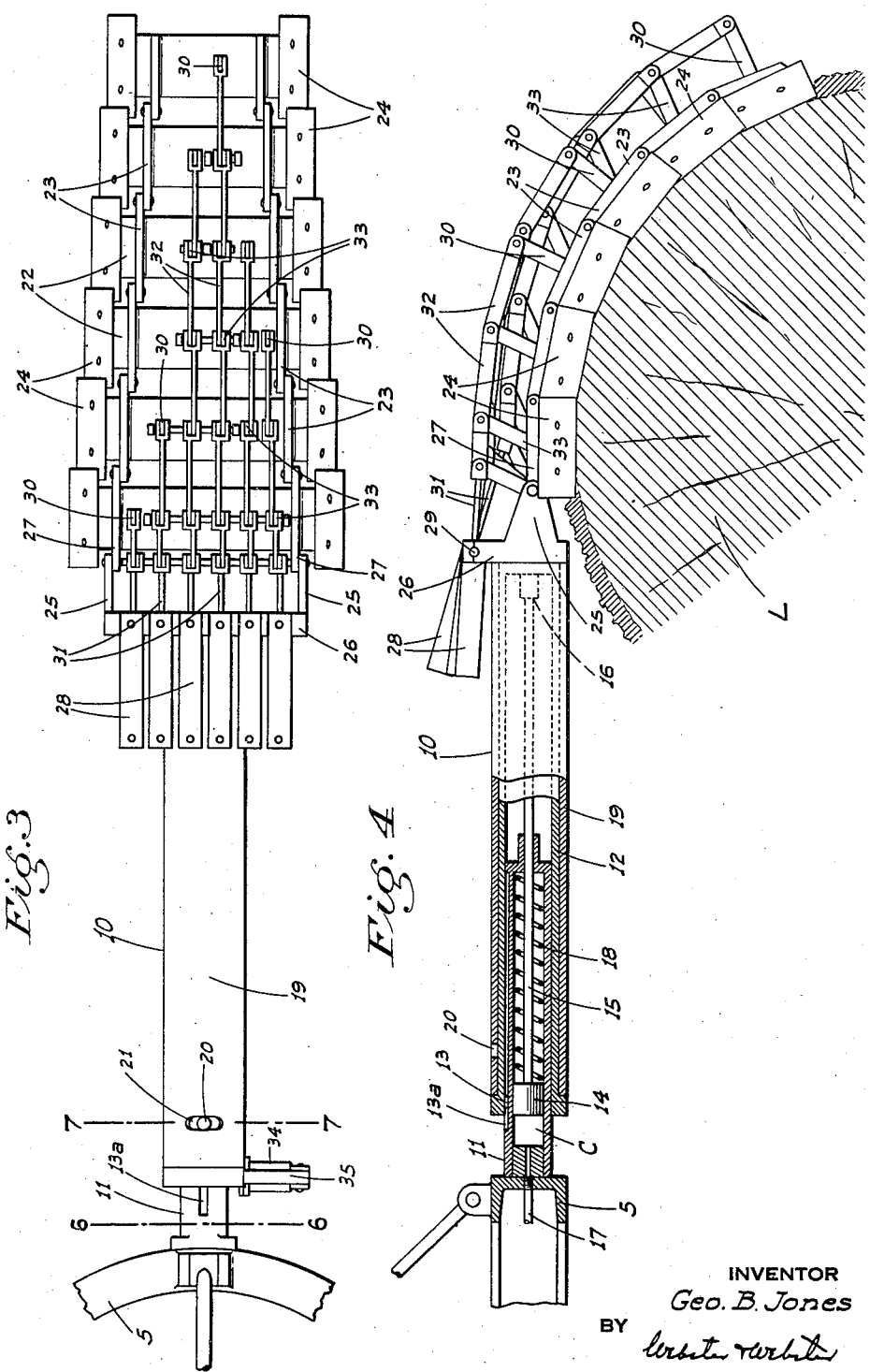

July 10, 1945. G. B. JONES 2,380,049
BARK PEELING MACHINE
Filed Oct. 6, 1942 4 Sheets—Sheet 4
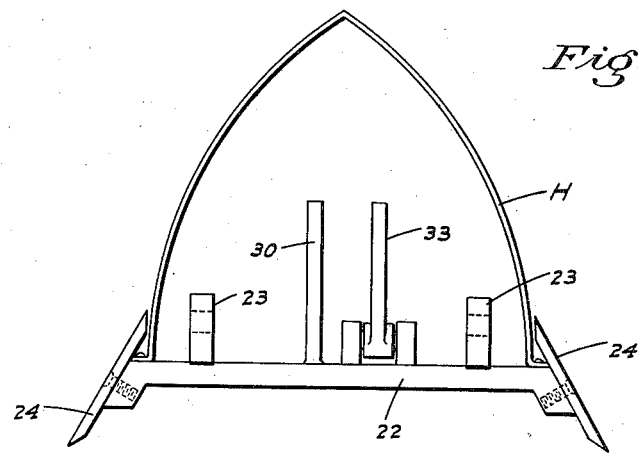
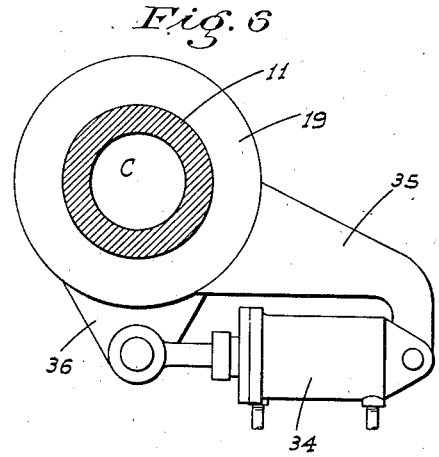
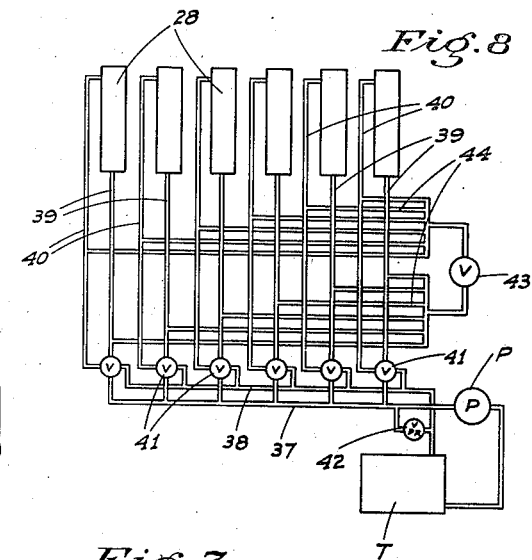
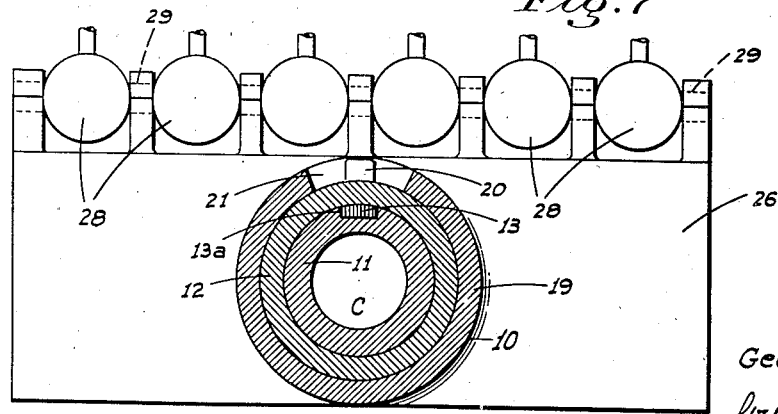
INVENTOR
Geo. B. Jones
ATTORNEYS Patented July 10, 1945

2,380,049

UNITED STATES PATENT OFFICE 2,380,049

BARK PEELING MACHINE

George B. Jones, Caspar, Calif.

Application October 6, 1942, Serial No. 460,938

12 Claims. (Cl. 144—208)

This invention relates in general to a machine for use in the logging industry, and in particular the invention is directed to, and it is my principal object to provide, a machine for peeling bark from logs prior to milling the latter. In the logging of redwood, and other species of trees which have a deep bark, it is necessary to remove the bark before the logs are sawed in the mill, and my machine is designed for this purpose.

Another object of the invention is to provide a bark peeling machine which includes a power advanced blade assembly which is adapted to engage and extend across a log from one side thereof, and is operative to cut or slice the bark therefrom upon horizontal advance of said assembly lengthwise of the log; said blade assembly being segmental, rigid in a horizontal plane, but flexible in a vertical plane whereby to conform to the configuration of the log across which the assembly engages.

A further object of this invention is to provide a bark peeling machine which includes a supporting frame adapted to be mounted on a power driven vehicle, such as a tractor for field use or a power carriage for mill use; the bark peeling blade assembly being carried on the outer end of an extensible boom which is secured on said frame and projects laterally from the vehicle; the latter running alongside the log during the peeling operation.

An additional object of the invention is to provide a bark peeling machine which includes an extensible boom, as in the preceding paragraph, whereby to properly position the blade assembly transversely of the log, and which boom is also arranged for limited rotative movement at its outer end whereby to position said assembly at correct cutting angle relative to the bark; there being separate power means arranged with the boom to selectively effect such extension and rotation thereof.

It is also an object of this invention to provide a bark peeling machine which includes, in combination, a tractor mounted frame, an extensible boom pivoted for vertical swinging movement on and projecting laterally from said frame, and a segmental blade assembly secured in connection with the outer end of the boom and projecting therebeyond for engagement across a log alongside of which the tractor is to be driven, said assembly being mounted for limited rotation about the axis of the boom for proper adjustment of the cutting angle of the blades; there being operator controlled means to selectively and independently effect vertical swinging of the boom, extension of the boom, and rotation of said blade assembly to regulate said cutting angle.

A still further object of this invention is to provide a bark peeling machine which includes a boom-supported blade assembly of unique articulated construction and operation; said assembly including a plurality of parallel shoes disposed in adjacent but spaced side by side relation, adjacent ones of said shoes being pivoted together at the sides for relative swinging movement about a substantially horizontal axis at right angles to the axis of the boom, operator-controlled power actuated linkage connected with said shoes arranged to selectively and independently swing each to a position corresponding to log contour, and angularly disposed bark peeling blades mounted on the ends of the shoes.

A further object of the invention is to provide an exceedingly effective device which will be suitable for the purpose for which it is designed.

These objects I accomplish by means of such structure and relative arrangement of parts as will fully appear by a perusal of the following specification and claims.

In the drawings similar characters of reference indicate corresponding parts in the several views:

Figure 2 is an enlarged fragmentary end view of the bark peeling machine as mounted on a tractor; said machine being shown in raised or inoperative position.

Figure 3 is an enlarged fragmentary top plan showing the extensible boom and the segmental blade assembly; the bark deflecting hoods being removed from the latter.

Figure 4 is a fragmentary side elevation, partly in section, showing the extensible boom and the segmental blade assembly as in use; the bark deflecting hoods being removed from the latter.

Figure 5 is an end elevation of one of the shoe and blade units of the segmental blade assembly, detached.

Figure 6 is an enlarged cross section on line 6—6 of Figure 3.

Figure 7 is an enlarged cross section on line 7—7 of Fig. 3.

Figure 8 is a diagrammatic view of the fluid conduit system employed in connection with the plurality of hydraulic cylinders used to control the segmental blade assembly.

Figure 1:
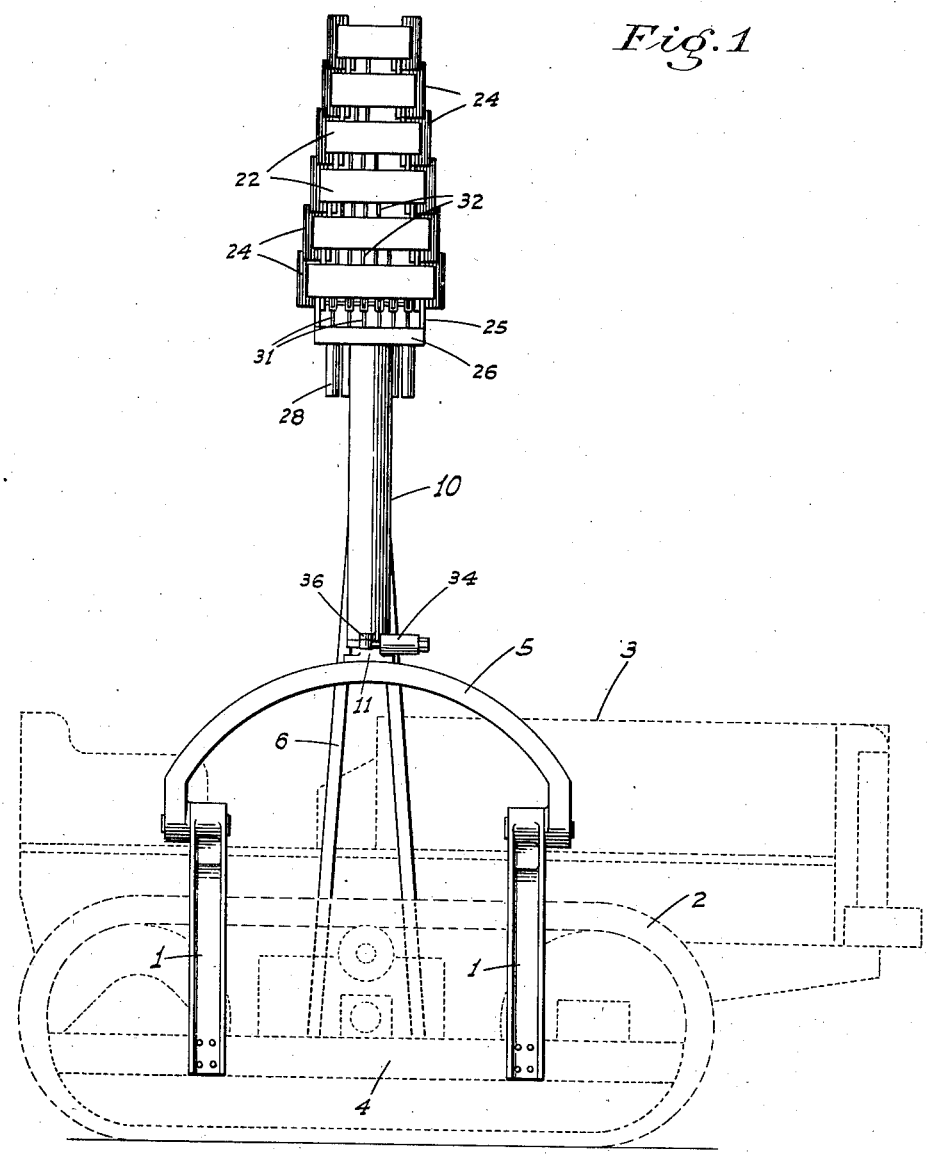
Figure 1 is a side outline of a tractor with the bark peeling machine mounted thereon, said machine being shown in raised or operative position.

Referring now more particularly to the characters of reference on the drawings, the bark peeling machine comprises a frame which includes a pair of U-shaped brackets 1 adapted to straddle the endless track 2 on one side of a vehicle such as a tractor 3; the lower ends of said brackets being rigidly secured to the corresponding track frame 4. The brackets 1 are spaced apart lengthwise of the tractor a substantial distance and are connected at their upper ends by means of a pivotally mounted swinging yoke 5. An upstanding A-frame 6 straddles, and is rigidly connected to, the tractor centrally between brackets 1. A double-acting hydraulic cylinder 7 is pivotally connected between ears 8 and 9 on the upper ends of the A-frame 6 and yoke 5 respectively; said cylinder being operator-controlled through the medium of valved conduits (not shown) arranged in a manner conventional to tractor mounted power cylinders.

A boom, indicated generally at 10, is secured to the yoke 5 centrally of its ends and projects therefrom in a plane at right angles to the direction of travel of the tractor 3. This boom is longitudinally extensible and comprises the following structure.

An elongated tubular member 11 is rigidly secured at one end in connection with the yoke 5, and is surrounded by a tubular sleeve 12 of substantially the same length; the sleeve 12 being secured in connection with the member 11 in relatively non-rotatable but extensible relation by means of a key 13 on sleeve 12 adjacent its inner end, riding in a longitudinal keyway 13a in the member 11. The member 11 is formed internally as a cylinder C in which a piston 14 is disposed; there being a piston rod 15 extending from the piston 14 through the outer end of the cylinder to a connection, as at 16, with the outer and closed end of sleeve 12. The piston 14 may be double-acting under hydraulic pressure, or as shown may be advanced by fluid pressure from conduit 17, controlled by the operator and retracted by a heavy-duty compression spring 18 engaged between piston 15 and the outer end of the cylinder C.

Another sleeve 19 surrounds sleeve 12 in closely fitting but relatively rotatable relation; a radial pin 20 projecting from sleeve 12 into a circumferential slot 21, of limited arcuate extent, cut in the outer sleeve 19.

A bark peeling blade assembly of segmental construction is secured in connection with the outer end of the above-described boom unit and projects outwardly therefrom, said assembly comprising the following:

A plurality of rigid elongated shoes 22 are disposed substantially horizontally and at right angles to the boom unit in adjacent, parallel but spaced relation to each other; the shoes on adjacent sides having spaced ears 23 which are pivoted together, whereby each shoe may pivot or swing in a vertical plane relative to the adjacent shoes. The shoes 22 progressively decrease in length from adjacent the boom, and at their outer ends said shoes are fitted with removable blades 24 disposed parallel to the boom but at an upward and inward slope from their lower cutting edge. These blades are of such length that they overlap at adjacent ends; the difference in length between adjacent shoes permitting such overlap of the blades without one striking the other. At the end adjacent the boom the segmental blade assembly above described is secured to said end of the boom by a pair of brackets 25 which project outwardly in spaced relation from an enlarged cross head 26 on said end of the boom, and such brackets 25 are pivoted in connection with correspondingly spaced ears 27 on the adjacent shoe 22.

Selective and independent pivotal or swinging movement of each of the shoes 22 is accomplished by means of a plurality of double-acting power cylinders 28 mounted in side by side relation on the cross head 26; said cylinders 28 being supported by trunnions 29 for swinging movement in a vertical plane lengthwise of the boom. Each cylinder corresponds to one of the shoes 22 and each shoe has a rigid upstanding post 30 secured thereto, the piston rod 31 of the corresponding cylinder 28 being connected to said post through the medium of pivotally connected links 32. The number of links 32 between each cylinder 28 and the corresponding post 30 depends on the number of intervening shoes. Such intervening shoes each carry an upstanding swingable arm 33 to support each chain of links 32 which extends thereabove; the arms 33 being concentrically pivoted with adjacent pivots of links 32. The chains of links 32 are disposed in side by side relation, as shown in Fig. 3. It will be seen that by selective actuation of the double-acting power cylinders 28 and resulting movement of shoes 22, the segmental blade assembly can be caused to assume a configuration generally corresponding to the exterior and cross-sectional configuration of the log L to be peeled, as illustrated in Fig. 4.

Limited rotative movement of the outer sleeve 19 relative to the inner sleeve 12 in one direction or the other will similarly cant the segmental blade assembly for the hereinafter described purpose; such limited rotative movement of sleeve 19 being accomplished through the medium of an independent operator-controlled power cylinder 34 of double-acting type mounted between a bracket 35 on the inner end of sleeve 12, and an ear 36 on the adjacent end of the sleeve 19; such rotative motion of sleeve 19 being limited by the pin 20 in slot 21.

The cylinders 28 are controlled independently of each other, and of cylinders 7, 34, and the boom-extension cylinder C; the conduit arrangement for this independent control for the cylinders 28 being shown diagrammatically in Fig. 8. A pressure fluid supply pump P is connected in series with a fluid supply tank T; there being a pressure feed pipe 37 leading from the pump and a fluid return pipe 38 leading to the bank. Each cylinder 28 is connected at opposite ends to conduits, indicated at 39 and 40 respectively, such conduits for each cylinder being connected through the medium of a four-way valve 41 with conduits 37 and 38 respectively. The valves 41 are all disposed within easy reach of the operator, and each such valve can be manipulated, as is obvious, to effect operation of the corresponding double-acting cylinder 28 in either direction. A pressure relief valve 42 is connected between the conduits 37 and 38.

At certain times during operation of the device, and as will hereinafter appear, it is desirable to permit the pistons of cylinders 28 to "float" therein, and this is accomplished by connecting a hand valve 43 in parallel across each pair of conduits 39 and 40 by means of the conduit arrangement indicated generally at 44. Valve 43 is normally closed but when opened the pistons may float in the cylinders 28, as the fluid bypasses between opposite ends of the cylinder through conduits 44 and valve 43.

*Operation*

In operation of the above described bark peeling machine, the tractor 3 is disposed alongside of the log adjacent one end thereof, and the operator actuates cylinder 7 to lower the boom 10 to laterally projecting position, as shown in dotted lines in Fig. 2. The boom is then extended to the extent necessary to dispose the segmental blade assembly across the circumferential portion of the log to be peeled.

Thereafter, the operator, by proper manipulation of valves 41, causes the segmental blade assembly to articulate, and engage and assume a configuration substantially that of said circumferential portion of the log. Also the cylinder 34 is actuated to cause the segmental blade assembly to tilt downwardly at its leading cutting edge. The tractor is then driven forwardly and the blades 24 at the leading edge of the segmental blade assembly immediately dig into the bark. As soon as the "suction" of the blades at the leading edge of the assembly pulls them beneath the bark, the cylinder 34 is released to neutral position and the valve 43 is opened. This permits the entire segmental blade assembly to "float" and follow the contour of the log with advance of the tractor; the suction of blades 24 assuring that the blade assembly does not rise from the bark and begin to skip.

As the tractor advances the bark peeling from the log is fed upwardly by the working blades 24, and hoods H of suitable configuration, deflect the loose bark over the blade assembly.

The segmental cutting blade assembly is fitted with blades 24 at both ends of the shoes 22 so that a peeling operation may be carried out as the tractor moves back and forth alongside the log. As the tractor completes a cut in one direction the operator actuates cylinder 34 so as to impart an opposite inclination to the segmental blade assembly, and as is necessary at the beginning of the reverse cut.

While the bark peeling machine herein described is shown in connection with a tractor for field use, the machine, with slight modification of the mounting frame, can be applied to a power carriage within the mill, and will function in substantially the same manner.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A bark peeling machine comprising a frame adapted to be mounted on a vehicle, an extensible boom unit projecting from the frame laterally of the direction of travel of the vehicle, operator controlled power means operative to extend and contract the boom unit, an operator controlled bark peeling blade assembly mounted on the outer end of the boom unit, for limited rotation about an axis parallel to the axis of the boom unit, and separate operator controlled power means operative to rotate said assembly to adjust the cutting angle of the latter; said assembly being power actuated, under the control of the operator, to engage in conforming relation across a log for bark peeling movement lengthwise thereof upon corresponding movement of the vehicle.

2. A bark peeling machine comprising a frame adapted to be mounted on a vehicle, a boom projecting from the frame laterally of the vehicle, a bark peeling blade assembly projecting beyond the outer end of said boom for engagement across a log and bark peeling movement lengthwise of the latter, said assembly being articulated lengthwise of the boom and including a plurality of blades disposed transversely of the log, and operator controlled power means connected to said assembly in articulating relation thereto so as to cause said blades to substantially conform to the cross sectional contour of the engaged portion of the log.

3. A bark peeling machine as in claim 2 in which said assembly includes a plurality of shoes disposed in alinement lengthwise of the boom, and on which the blades are mounted, and means pivoting adjacent shoes together for relative up and down swinging movement; said power means including a separate power cylinder corresponding to each shoe, and operating connections between each cylinder and the corresponding shoe.

4. A bark peeling machine comprising a blade assembly adapted to engage across a log for movement lengthwise thereof in bark peeling relation, and means arranged to mount said assembly in connection and for movement with a vehicle alongside the log; said assembly including a plurality of shoes disposed in adjacent but spaced relation transversely of the log, means pivoting adjacent shoes together for relative vertical swinging movement, bark peeling blades mounted on the shoes at one end, and operator controlled power means connected with said shoes operative to effect swinging movement thereof selectively and independently, whereby to cause said blades to substantially conform to the cross sectional contour of the engaged portion of the log.

5. A bark peeling machine as in claim 4 in which said power means includes a separate, double acting power cylinder operatively connected with each shoe; a valved conduit system connected with said cylinders, said system being operative to effect independent and selective actuation of said cylinders in either direction.

6. A bark peeling machine as in claim 4 in which said power means includes a separate, double acting power cylinder operatively connected with each shoe; a valved conduit system connected with said cylinders, said system being operative to effect independent and selective actuation of said cylinders in either direction, and said system including valve means to establish free communication between opposite ends of the cylinders whereby the pistons therein may float.

7. A bark peeling machine as in claim 4 in which said power means comprises a plurality of double acting power cylinders mounted adjacent one end of the assembly, there being a separate cylinder corresponding to each shoe, and an operating linkage connecting each cylinder to the corresponding shoe.

8. A bark peeling machine as in claim 4 in which said power means comprises a plurality of double acting power cylinders mounted adjacent one end of the assembly, there being a separate cylinder corresponding to each shoe, and an operating linkage connecting each cylinder to the corresponding shoe; said linkage including an upstanding post rigidly mounted on each shoe, a chain of links between each shoe and the corresponding cylinder, and pivotally mounted links upstanding from intervening shoes and connected with said chains at their pivot points, in supporting relation thereto.

9. A bark peeling machine comprising a blade assembly adapted to engage across a log for movement lengthwise thereof in bark peeling relation, and means adapted to mount said assembly in connection and for movement with a vehicle alongside the log; said assembly including a plurality of shoes disposed in adjacent but spaced relation transversely of the log, means pivoting adjacent shoes together for relative vertical swinging movement, bark peeling blades mounted on the shoes at one end, and operator controlled power means connected to said shoes operative to effect swinging movement thereof selectively and independently to cause said blades to substantially conform to the cross sectional contour of the engaged portion of the log; there being deflecting hoods mounted on the shoes adjacent the blades whereby to deflect bark from the blades over said shoes.

10. A bark peeling machine comprising a blade assembly adapted to engage across a log for movement lengthwise thereof in bark peeling relation, a boom supporting said assembly for engagement across a log and bark peeling movement lengthwise thereof, and means adapted to mount said boom on a vehicle in laterally projecting relation; said boom being extensible and including telescopic sleeves, means to telescope or extend said sleeves, means to limit extension of said sleeves, a third sleeve surrounding the outer one of said telescopic sleeves, means securing said third and outer sleeve together for limited relative rotation but against relative longitudinal movement, said blade assembly being mounted on said third sleeve, and separate power means connected to said third sleeve to effect said limited rotation thereof.

11. A bark peeling machine comprising a yoke, a frame structure adapted to mount said yoke on a vehicle at one side thereof and for swinging movement in a vertical transverse plane, a boom fixed on and projecting outwardly from the yoke, power means between the vehicle and yoke operative to positively swing the latter, and a bark peeling blade assembly mounted in connection with the outer end portion of the boom and operative to engage across a log in conforming and bark peeling relation thereto; said boom being extensible, the outer end portion thereof being mounted for limited rotation, and operator controlled means to effect selective and independent extension of the boom and rotation of said outer end portion thereof.

12. A bark peeling machine comprising a frame adapted to be mounted on a vehicle, a boom projecting from the frame laterally of the vehicle, a bark peeling blade assembly mounted on and projecting outwardly from the outer end of said boom for engagement across a log in bark peeling relation thereto upon movement of the vehicle lengthwise of and adjacent said log, said assembly being inflexible in a horizontal plane, and flexible in a vertical plane, and operator controlled means connected with said assembly operative to cause the latter to flex and assume a configuration substantially corresponding to the cross sectional contour of the engaged portion of the log.

GEORGE B. JONES.